US009442656B2

(12) United States Patent
Abe et al.

(10) Patent No.: US 9,442,656 B2
(45) Date of Patent: Sep. 13, 2016

(54) EFFICIENT USE OF METADATA ACCOMPANYING FILE WRITING TO MEDIA

(71) Applicant: International Business Machines Corporation, Armonk, NY (US)

(72) Inventors: Atsushi Abe, Ebina (JP); Tohru Hasegawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/692,066

(22) Filed: Apr. 21, 2015

(65) Prior Publication Data

US 2015/0324128 A1 Nov. 12, 2015

(30) Foreign Application Priority Data

May 12, 2014 (JP) .................................. 2014-098616

(51) Int. Cl.
*G06F 3/06* (2006.01)
*G06F 12/08* (2016.01)

(52) U.S. Cl.
CPC ............... *G06F 3/06* (2013.01); *G06F 3/0604* (2013.01); *G06F 3/0631* (2013.01); *G06F 3/0643* (2013.01); *G06F 3/0644* (2013.01); *G06F 3/0656* (2013.01); *G06F 3/0682* (2013.01); *G06F 12/08* (2013.01); *G06F 12/0866* (2013.01); *G06F 2212/1012* (2013.01); *G06F 2212/202* (2013.01); *G06F 2212/213* (2013.01);
(Continued)

(58) Field of Classification Search
CPC ................... G06F 12/0866; G06F 2212/1012; G06F 2212/202; G06F 2212/213; G06F 2212/222; G06F 2212/70; G06F 3/0604; G06F 3/0643; G06F 3/0656; G06F 3/0682; G06F 11/3086; G06F 17/3012; G06F 17/30525; G06F 17/30722; G06F 17/30997; G06F 2212/466; G06F 2212/7207; G06F 11/1435

See application file for complete search history.

(56) References Cited

U.S. PATENT DOCUMENTS

| | | | |
|---|---|---|---|
| 7,362,946 B1* | 4/2008 | Kowald | G11B 27/034 360/13 |
| 9,152,352 B1* | 10/2015 | Fair | G06F 3/0686 |
| 2002/0120925 A1* | 8/2002 | Logan | A23L 1/3002 725/9 |

(Continued)

FOREIGN PATENT DOCUMENTS

| | | |
|---|---|---|
| JP | 05307443 A | 11/1993 |
| JP | 10-069375 A | 10/1998 |

(Continued)

OTHER PUBLICATIONS

"Efficient Use of Metadata Accompanying File Writing to Media", Japanese Patent Application No. 2014-098616, filed on May 12, 2014.

*Primary Examiner* — Dionne H Pendleton
(74) *Attorney, Agent, or Firm* — Noah A. Sharkan; Olivia R. Scheuer

(57) ABSTRACT

In one embodiment of the present invention, a method for holding metadata written by a file system is provided. It is determined whether first metadata written to a storage medium belongs to a first group of metadata written intentionally by a user, or to a second group of metadata automatically written by a file system. Responsive to determining that the first metadata belongs to the first group, the first metadata is held in memory using a back pointer holder to differentiate the first metadata from metadata belonging to the second group.

16 Claims, 9 Drawing Sheets

(52) U.S. Cl.
 CPC ..... *G06F 2212/222* (2013.01); *G06F 2212/70* (2013.01)

(56) References Cited

U.S. PATENT DOCUMENTS

| | | | | |
|---|---|---|---|---|
| 2005/0286863 | A1* | 12/2005 | Howarth | G11B 27/034 386/232 |
| 2009/0313503 | A1* | 12/2009 | Atluri | G06F 11/1453 714/19 |
| 2014/0059009 | A1* | 2/2014 | Blea | G06F 11/1471 707/645 |
| 2014/0201424 | A1* | 7/2014 | Chen | G06F 3/0674 711/103 |
| 2014/0215145 | A1* | 7/2014 | Ballard | G06F 3/0682 711/111 |
| 2015/0261465 | A1* | 9/2015 | Joseph | G06F 3/0619 711/104 |
| 2015/0356079 | A1* | 12/2015 | Flick | G06F 17/3002 707/746 |

FOREIGN PATENT DOCUMENTS

| | | |
|---|---|---|
| JP | 2009521763 A | 6/2009 |
| WO | 2007074431 A2 | 7/2007 |

\* cited by examiner

US 9,442,656 B2

EFFICIENT USE OF METADATA ACCOMPANYING FILE WRITING TO MEDIA

BACKGROUND OF THE INVENTION

The present invention relates to the efficient use of metadata accompanying file writing to media.

More specifically, the present invention relates to the efficient use of metadata accompanying the writing of files to media by a file system when the metadata is provided in the form of a list.

A file system known as a linear tape file system (LTFS) has recently been developed as a new way of using magnetic tape.

In LTFS, software (S/W) works with hardware (H/W) to enable tape to be accessed via a file system interface. LTFS has open specifications. The LTFS format calls for the partition of a tape cartridge into two partitions: an index partition (IP) and a data partition (DP). The index partition (IP) and the data partition (DP) are established in separate locations on the tape medium. Metadata such as file allocation information is recorded in the index partition (IP). The main body of data is recorded in the data partition (DP). The following is background on the establishment of these partitions.

File allocation information is frequently updated, and tape is a typical example of a sequential access device, so data is always being appended and the allocation information is typically recorded at the end when there is a single partition. Therefore, when a tape cartridge is mounted, the mounting process can take a long time because information recorded at the end always has to be retrieved.

In LTFS, when a tape cartridge is unmounted, the metadata is overwritten at the beginning of the index partition so that, during mounting, the metadata can always be retrieved from the index partition.

In addition to writing metadata in the index partition, the metadata is written in the data partition. When metadata has been written to the data partition, but the updated metadata is not overwritten in the index portion (e.g., because of a sudden power outage), the metadata recorded in the data partition can be used to mount the tape again even though the process takes more time.

The index partition is typically configured to be able to store a small amount of data, and data to be retrieved at the time of mounting is written not only in the data partition but also in the index partition. As a result, such data can be quickly retrieved from the index partition.

FIG. 1 is a diagram showing an example of information recorded in a typical tape cartridge. In this example, a specially designated file (File B) and metadata (Metadata 3) are recorded in the index partition, and metadata (Metadata 1, Metadata 2, and Metadata 3) is recorded in the data partition, in addition to the other data (File A, File B, File C, and File D).

Here, Metadata 1 and Metadata 2 are old metadata. Because information is basically appended on the tape, that information is stored without being overwritten.

The timing for writing metadata to the data partition can be specified in LTFS by settings, such as at the time a file is closed or after a predetermined amount of time has elapsed, in addition to when explicitly specified by an application (for example, when FlushFileBuffers( ) is called, which is a known API). One reason for this is because when a large amount of data is written to the data partition without writing metadata to the data partition, and a sudden loss of power occurs, all of the data written after the last recorded metadata is lost.

FIG. 2 is a diagram showing an example in which only data has been written to the data partition. As shown in FIG. 2, information is recorded on the tape when Files A, B, C and D have been written to the data partition, after a tape cartridge has been formatted and mounted. As Metadata 1 is the metadata added immediately after formatting, it does not have any subsequently written file information. If power is lost at this time, before unmounting the tape, the system cannot determine where the data in Files A, B, C and D stored, and so all of the files are lost.

Applications assuming use of USB memory and HDD are typically not designed to call up an API, such as FlushFileBuffers( ), after the data has been written. Therefore, in LTFS, in order to minimize data loss during a sudden power outage, the recording of metadata to the data partition every five minutes is recommended, which is also typically the default setting.

Since metadata written to the data partition is not overwritten, a tape cartridge can be mounted using old metadata in LTFS. This function is called rollback, and rollback can be used to return to a snapshot taken at a previous point in time.

In the LTFS format, the metadata contains a generation number, and the mechanism used to determine the location of the metadata on the tape during the performance of rollback is the recording of a pointer to the previous metadata (more specifically, to the block number on the tape to which the previous generation has been written). This pointer is referred to as a "back pointer".

FIG. 3 is a diagram showing generation numbers of metadata and back pointers. In the example shown in FIG. 3, the metadata for Generation No. 3 has a back pointer to the metadata for Generation No. 2, and the metadata for Generation No. 2 has a back pointer to the metadata for Generation No. 1. There is no back pointer in the metadata for Generation No. 1 because it is the initial metadata.

FIG. 4 is a diagram showing file marks before and after metadata. In the LTFS format, as shown in FIG. 4, delimiting information called file marks are recorded before and after metadata when metadata is recorded on the tape.

All metadata can be accessed on the tape using the following methods in accordance with these provisions: 1) Back pointers are traced in sequential order from the final metadata recorded on the tape; and 2) File marks are repeatedly located from the beginning of the tape, and the metadata between file marks is retrieved.

In LTFS, the first and second methods are typically used to list all of the metadata written in the data partition for the user, and an interface is prepared that allows the user to select the generation to be used in a rollback process.

FIG. 5 shows an example of a rollback generation selection screen and interface (or metadata selection screen in some implementations of LTFS). When the amount of metadata recorded on the tape is large, the first and second methods can require a lot of time to display the list of metadata. When metadata is written to the data partition on a regular basis to prepare for a sudden power outage, there can be more metadata than the user expects, which can cause the following problems when rollback is performed, such as the process taking much longer than expected, and difficulty in determining which generation of metadata should be selected.

SUMMARY

According to one embodiment of the present invention, a method for holding metadata written by a file system is provided, the method comprising: determining whether first metadata written to a storage medium belongs to a first group of metadata written intentionally by a user, or to a second group of metadata automatically written by a file system; and responsive to determining that the first metadata belongs to the first group, holding the first metadata in memory using a back pointer holder to differentiate the first metadata from metadata belonging to the second group.

According to another embodiment of the present invention, an apparatus for holding metadata written by a file system is provided, the apparatus comprising: a tape cartridge including a tape medium; a file system; and a computer program for executing in the file system, the computer program having program code copied thereon for performing operations comprising: determining whether first metadata written to the tape medium belongs to a first group of metadata written intentionally by a user, or to a second group of metadata automatically written by the file system; and responsive to determining that the first metadata belongs to the first group, holding the first metadata in memory using a back pointer holder to differentiate the metadata written to the tape medium from metadata belonging to the second group.

DETAILED DESCRIPTION

It is an object of the present invention to solve the problems related to the prior art, as described above.

In one embodiment, when metadata written to the data partition is divided into the following two groups, Group A and Group B, and metadata is generated, the back pointer in the metadata always points to the previous metadata in Group A.

Group A includes: Metadata written at the beginning of a tape during formatting; metadata written when a tape is unmounted; and metadata created explicitly by the user using an API such as FlushFileBuffers( ). In other words, Group A is a group for metadata written intentionally by the user, and is established for metadata recorded at the convenience of the user. This can be used to construct an interface that makes it easier for the user to select the generation of metadata used during the rollback process. For this reason, the definition is broadly interpreted to mean "the group written intentionally by the user".

Group B includes: Metadata periodically or regularly written at the file close timing specified by LTFS. In other words, Group B, as "the group automatically written by the file system (LTFS)", is separate from "the group written intentionally by the user". Because these groups are logical groupings, the locations of the groups can be readily determined internally by LTFS when metadata is generated.

In an embodiment of the present invention, when metadata is listed during the rollback process, back pointers can be traced in sequential order from the most recent one, to list only metadata which has been written intentionally by the user (Group A). Because metadata not intentionally written by the user increases the time required by the user to perform the rollback process, this can help solve the problem of identifying the generation of metadata to be used by the user in the rollback process.

Figure 1:
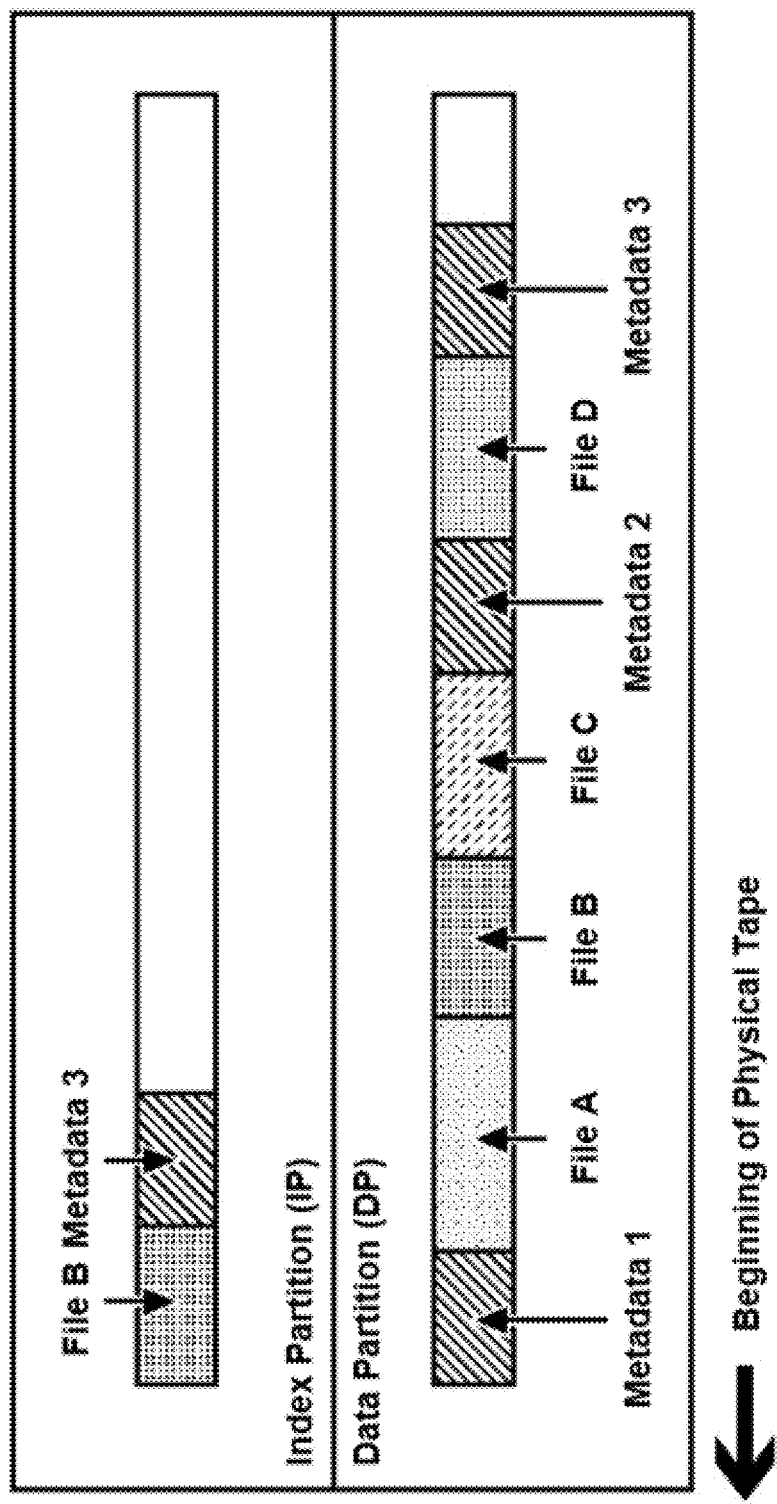
FIG. 1 is a diagram showing an example of information recorded in a tape cartridge.
Figure 2:
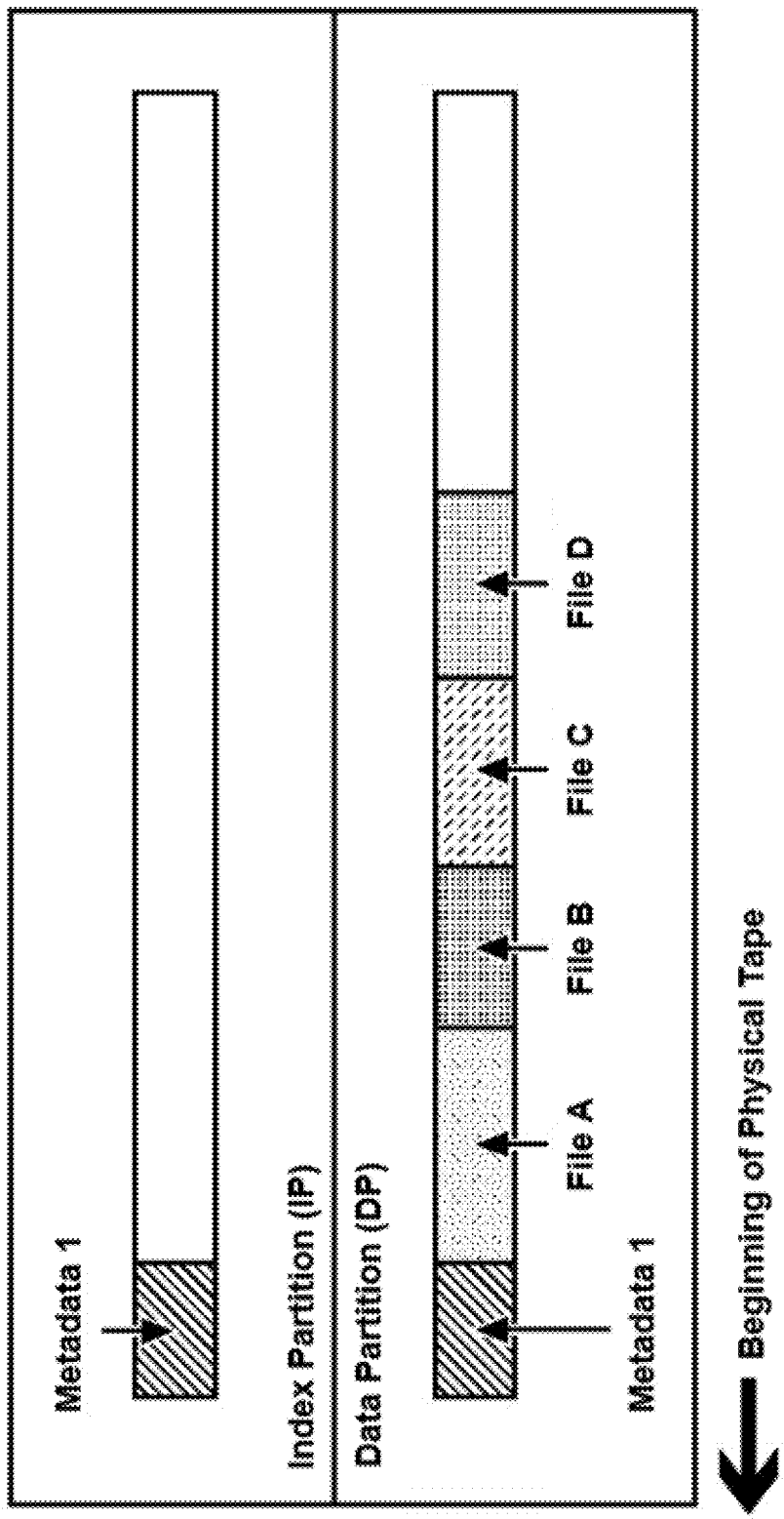
FIG. 2 is a diagram showing an example in which only data has been written to the data partition.
Figure 3:
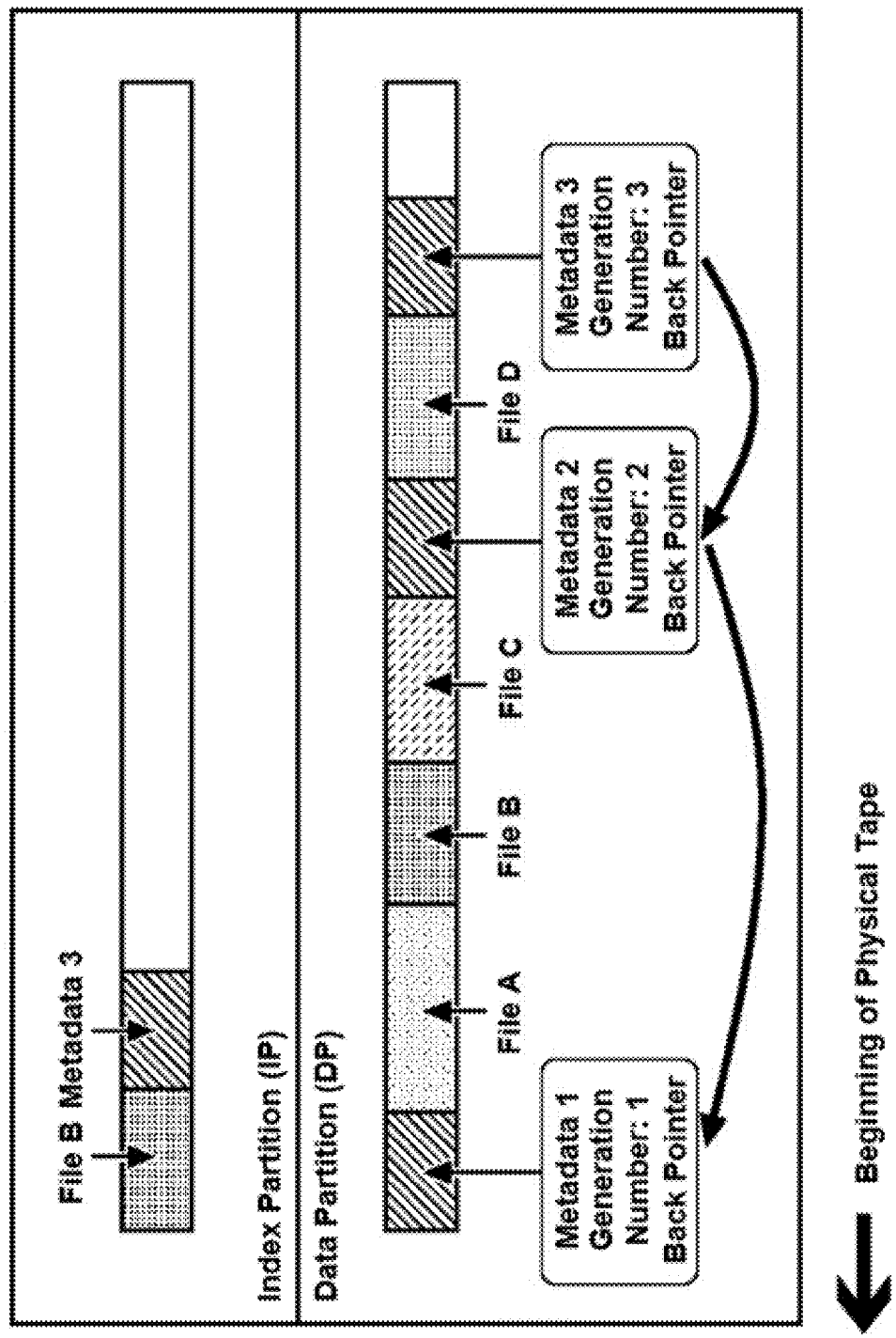
FIG. 3 is a diagram showing generation numbers of metadata and back pointers.
Figure 4:
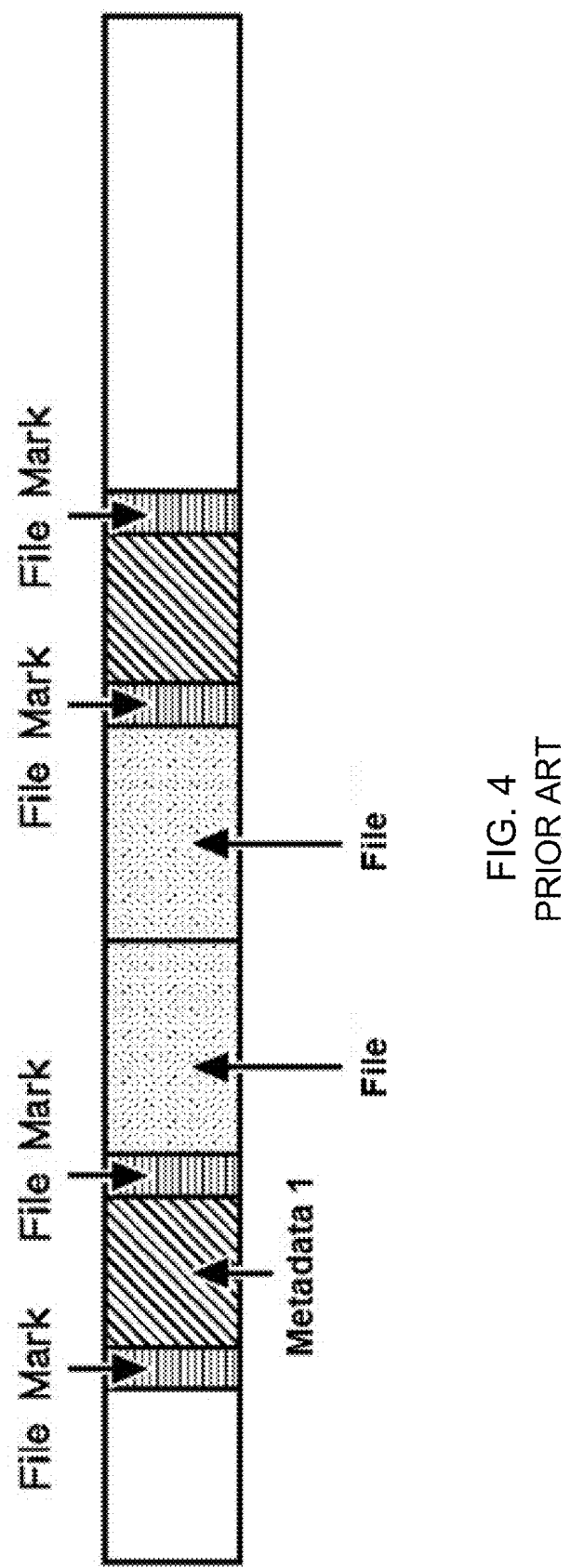
FIG. 4 is a diagram showing file marks before and after metadata.
Figure 5:
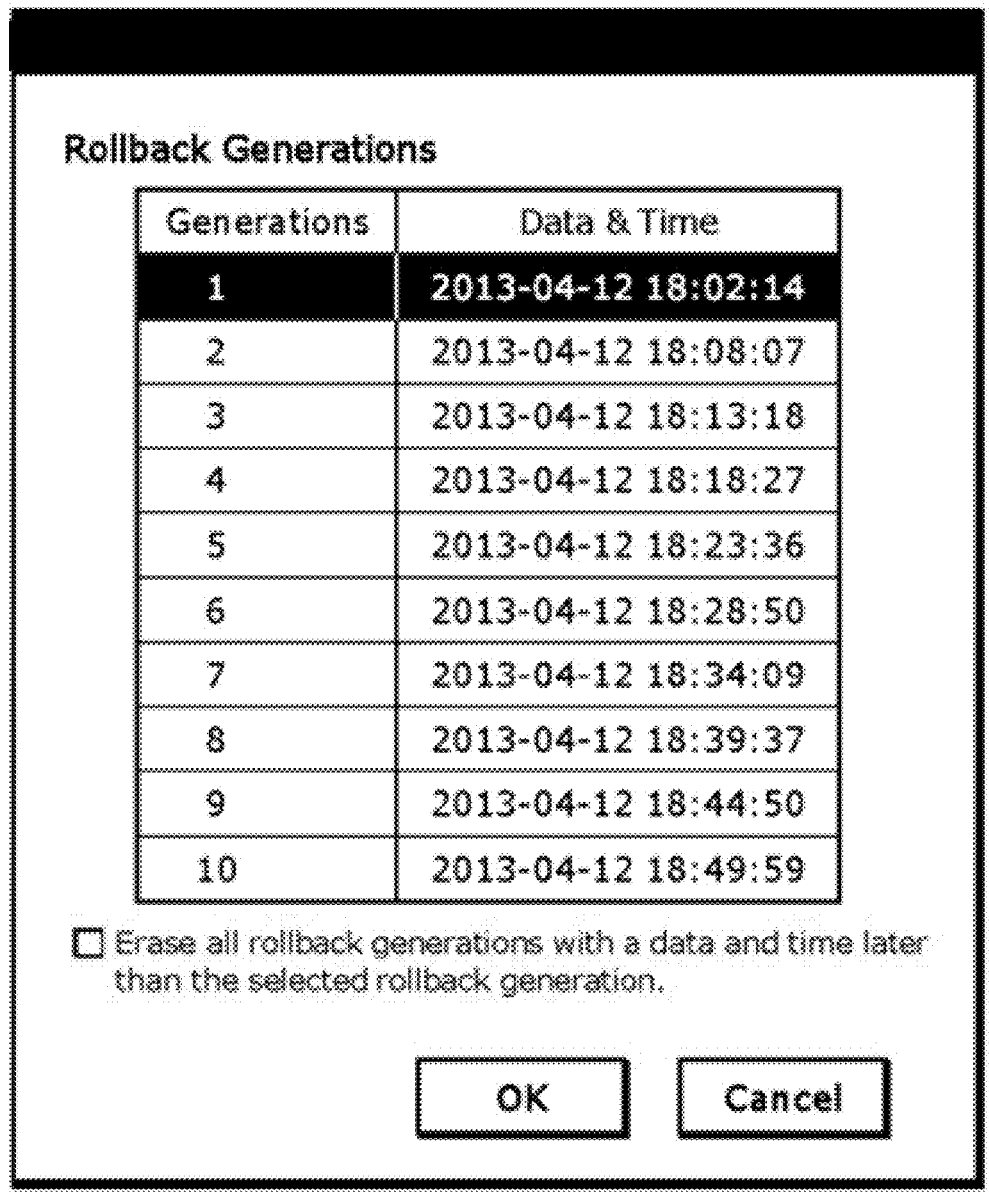
FIG. 5 shows an example of a rollback generation selection screen.
Figure 6:
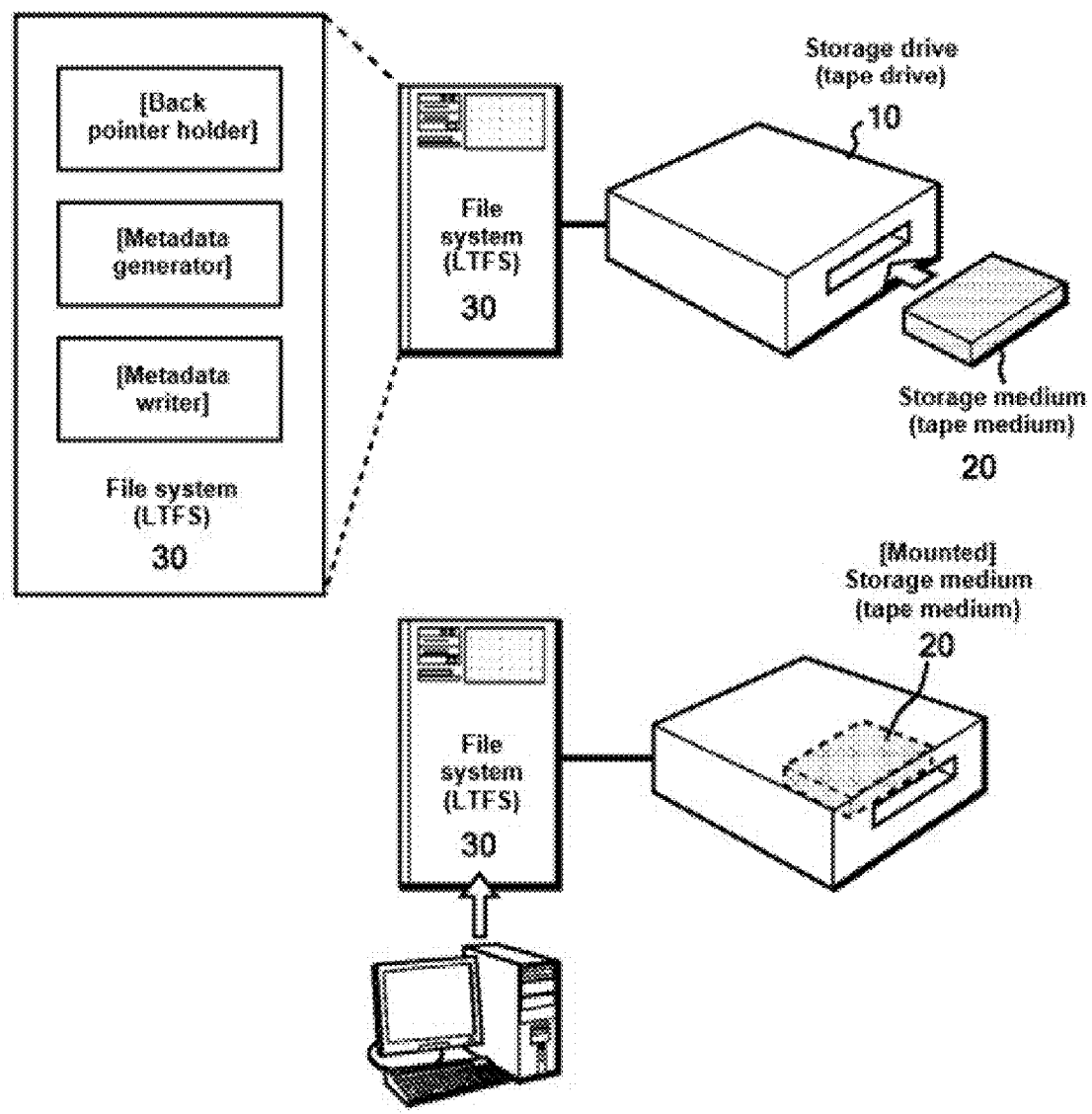
FIG. 6 is a configuration diagram, in accordance with an embodiment of the present invention.

FIG. 6 is a configuration diagram, in accordance with an embodiment of the present invention. This configuration includes file system (LTFS) 30 used in conjunction with storage drive 10 (i.e., tape drive) and storage medium 20 (i.e., tape medium). File system 30 includes back pointer holder 31, metadata generator 32, and metadata writer 33. In a current version of LTFS, the location on the storage medium 20 (i.e., block number) of the most recent metadata in Group A is held by back pointer holder 31 after it has been written to the data partition.

Figure 7:
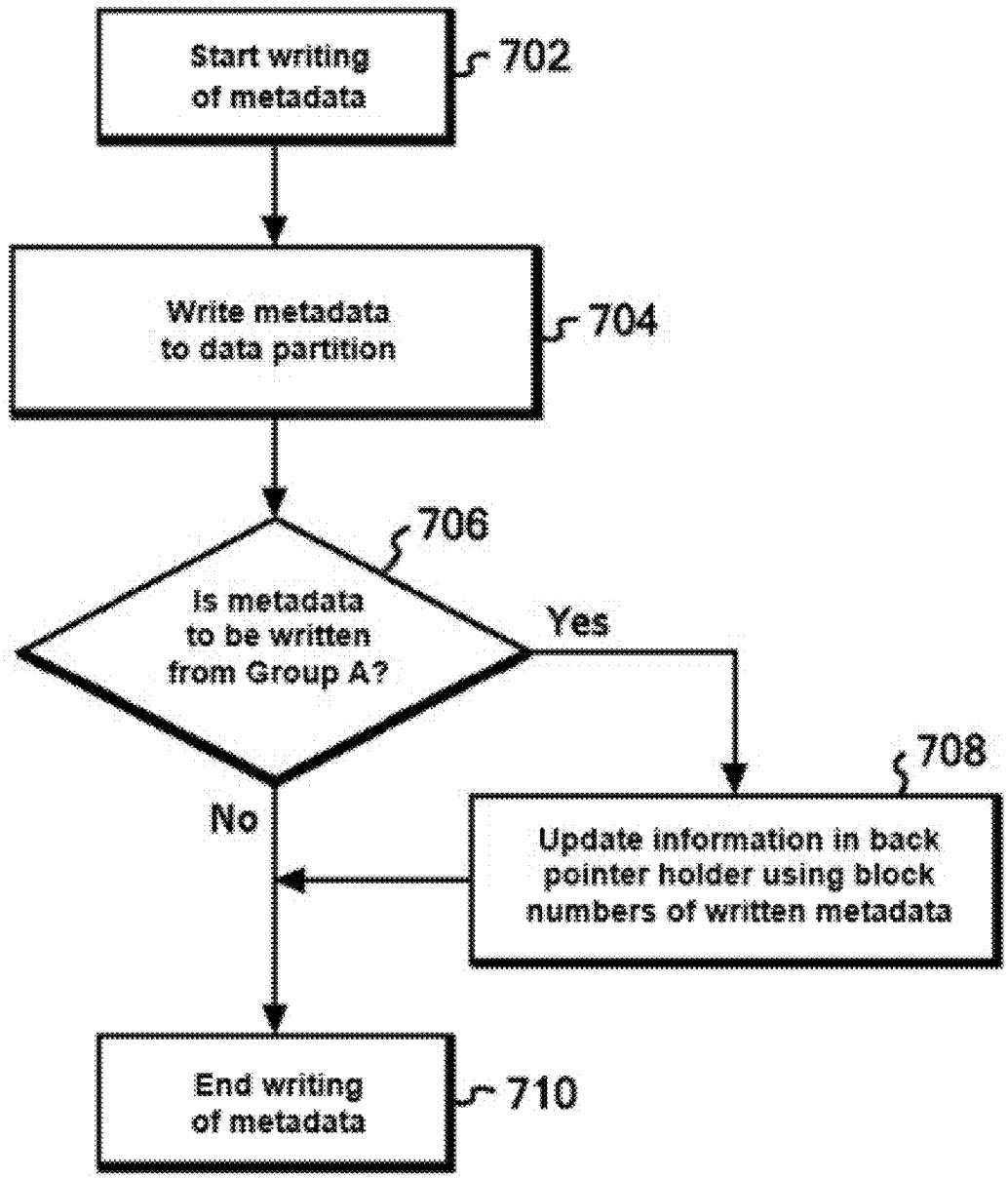
FIG. 7 shows a flowchart of operations performed during the metadata writing process, in accordance with an embodiment of the present invention.

FIG. 7 shows a flowchart of operations performed during the metadata writing process when metadata is written to the data partition, in accordance with an embodiment of the present invention.

In operation 702, writing of metadata is started. In operation 704, metadata is written to the data partition. In operation 706, a determination is made as to whether metadata is to be written from Group A. If metadata is to be written from Group A (operation 706; Yes branch), information in a back pointer holder is updated using block numbers of written metadata. If metadata is not to be written from Group A (operation 706, No branch), or after performing operation 708, then, in operation 710, writing of metadata is ended. By dividing the metadata by group and writing the metadata to the data partition, the back pointer to metadata always points to the previously written metadata belonging to Group A.

Figure 8:
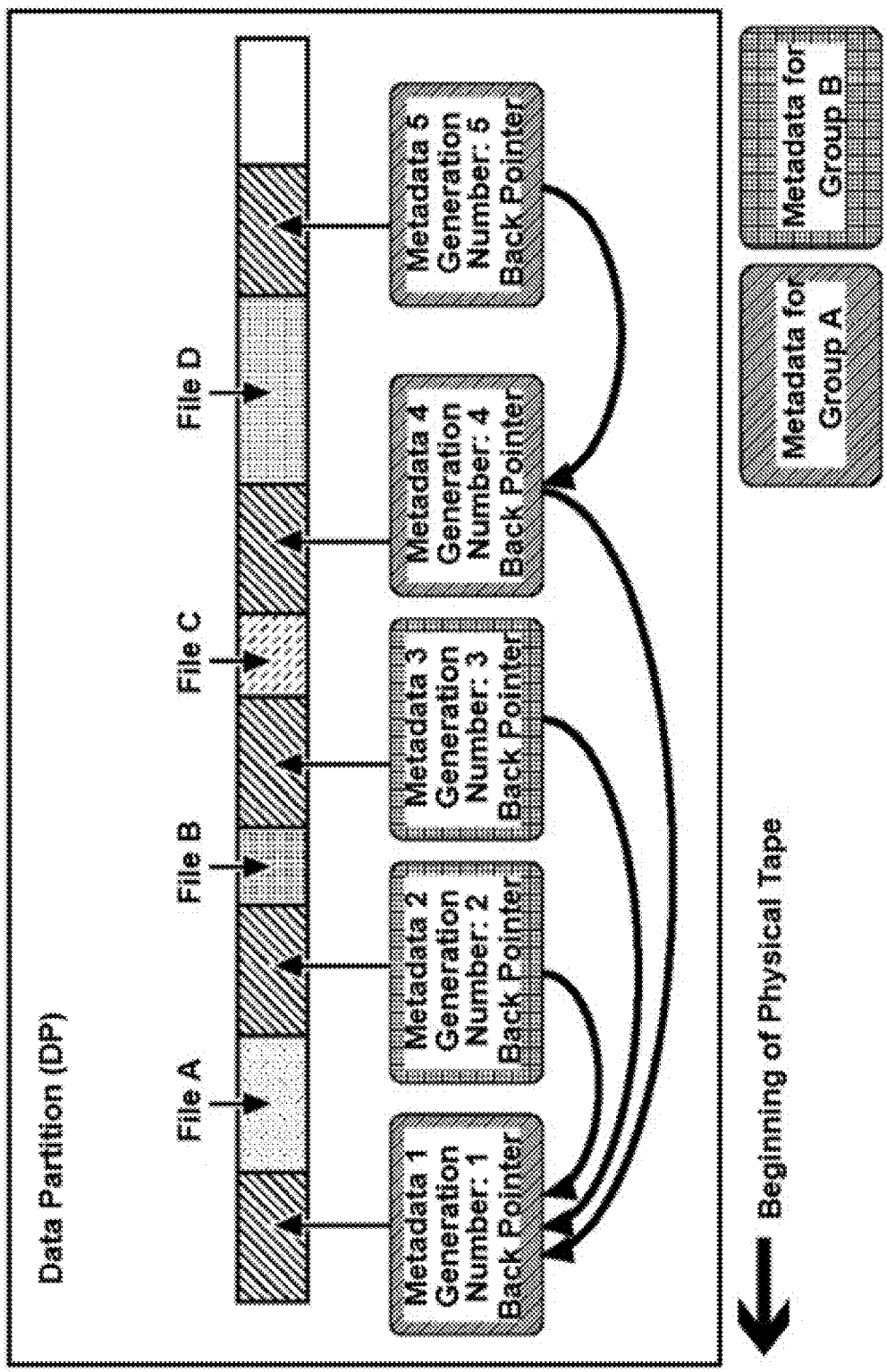
FIG. 8 is a diagram showing generation numbers of metadata and back pointers used in the present invention, in accordance with an embodiment of the present invention.

FIG. 8 is a diagram showing generation numbers of metadata and back pointers used in the present invention, in accordance with an embodiment of the present invention. In FIG. 8, five sets of metadata are divided into Group A (Metadata 1, 4 and 5) and Group B (Metadata 2 and 3).

The back pointers for Metadata 2, 3 and 4 point to Metadata 1. In this way, the metadata belonging to Group A can be found by following the back pointers.

When embodiments of the present invention are applied to LTFS and metadata is listed during the rollback process, back pointers can be traced in sequential order from the most recent one, to list only metadata which has been written intentionally by the user. When the user wishes to acquire all of the recorded metadata, file marks can be repeatedly located from the beginning of the tape, and the metadata between file marks can be retrieved. In other words, when the present invention is applied to LTFS and metadata is listed during the rollback process, the user interface can be set to allow the user to list all metadata intentionally created by the user or to list all of the metadata.

Figure 9:
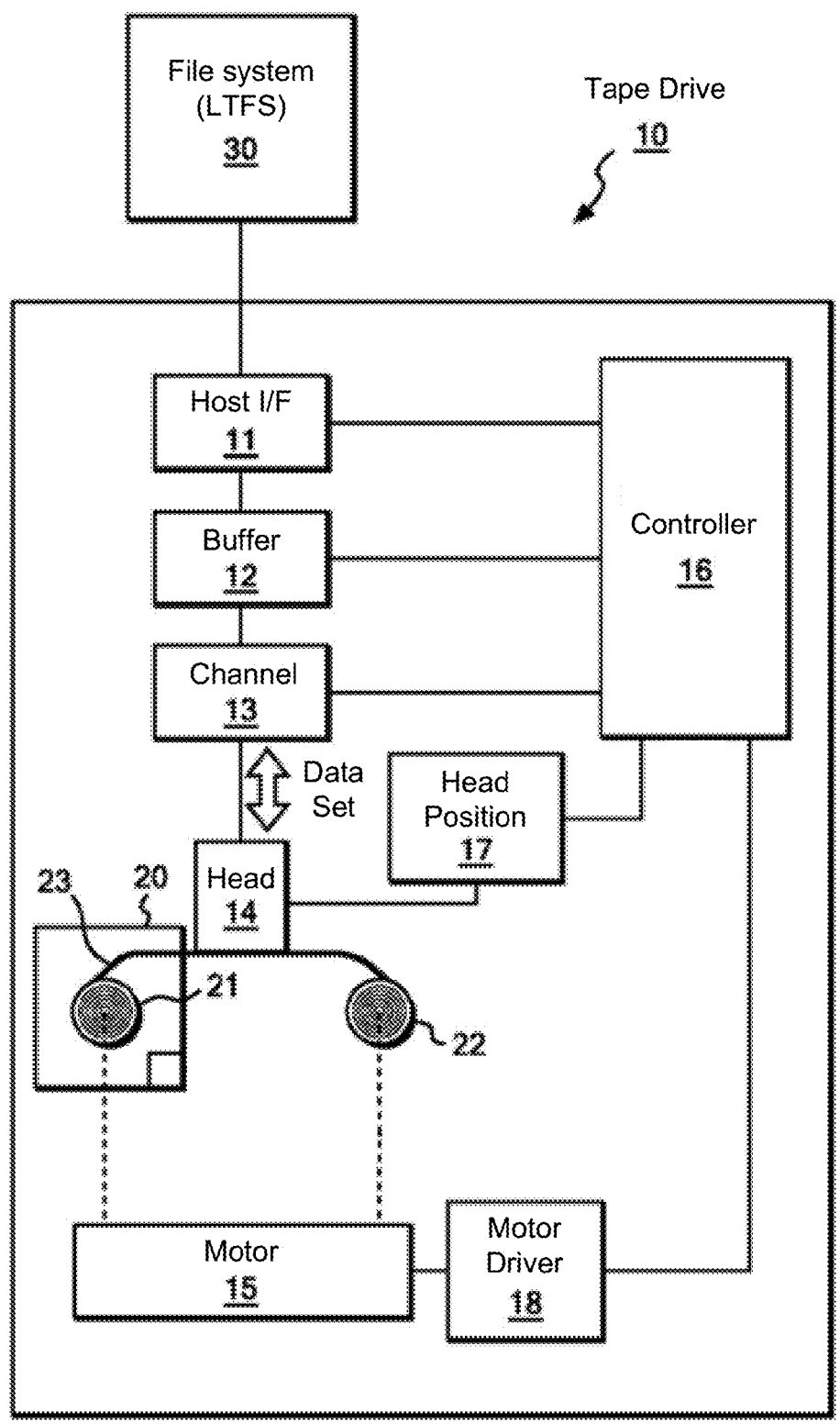
FIG. 9 shows an example of a configuration enabling LTFS to access tape via a file system interface, in accordance with an embodiment of the present invention.

FIG. 9 shows an example of a configuration enabling LTFS to access tape via a file system interface, in accordance with an embodiment of the present invention. This diagram also shows an example of an internal configuration of tape drive 10.

As shown, tape drive 10 is connected to file system 30. Tape drive 10 includes host I/F 11, buffer 12, channel 13, head 14, motor 15, controller 16, head position controller 17, motor driver 18, storage medium 20 having tape medium 23, and rollers 21 and 22.

Embodiments of the present invention can be applied more broadly to media other than tape media. Distinguishing features of embodiments of the present invention can also be realized on the medium itself in terms of metadata being divided and written (recorded).

In addition to file systems in which hardware (H/W) and software (S/W) work in tandem, the present invention can also be realized as a computer program (S/W) to which program code for implementing the method in a file system has been copied.

What is claimed is:

1. A method for holding metadata written by a file system, the method comprising:
    determining whether first metadata written to a storage medium belongs to a first group of metadata written intentionally by a user, or to a second group of metadata automatically written by a file system, wherein the storage medium is a tape medium including additional metadata written to a data partition of the tape medium along with one or more files written to the data partition, and metadata overwritten on an index partition of the tape medium in a location separate from the data partition; and
    responsive to determining that the first metadata belongs to the first group, holding the first metadata in memory using a back pointer holder to differentiate the first metadata from metadata belonging to the second group.

2. The method according to claim 1, wherein the first metadata is written so that previously written metadata belonging to the first group is pointed to.

3. The method according to claim 2, wherein the first metadata comprises one or more of information related to a generation of metadata recorded on the storage medium, and information related to a recording position of metadata recorded on the storage medium.

4. The method according to claim 1, wherein the second group includes metadata automatically written by the file system at a time at which a file is closed.

5. The method according to claim 1, wherein the metadata recorded in the data partition includes a generation number and one or more block numbers of a tape medium that includes a previously written generation of metadata.

6. The method according to claim 5, wherein the metadata overwritten on the index partition includes only the most recently recorded metadata.

7. The method according to claim 1, wherein a file mark is written before and after the first metadata on the storage medium.

8. The method according to claim 7, further comprising:
    tracing the first metadata; and
    displaying to a user a list of metadata belonging to the first group.

9. An apparatus for holding metadata written by a file system, the apparatus comprising:
    a tape cartridge including a tape medium;
    a file system; and
    a computer program for executing in the file system, the computer program having program code copied thereon for performing operations comprising:
        determining whether first metadata written to the tape medium belongs to a first group of metadata written intentionally by a user, or to a second group of metadata automatically written by the file system, wherein the tape medium includes additional metadata written to a data partition of the tape medium along with one or more files written to the data partition, and metadata overwritten on an index partition of the tape medium in a location separate from the data partition; and
        responsive to determining that the first metadata belongs to the first group, holding the first metadata in memory using a back pointer holder to differentiate the metadata written to the tape medium from metadata belonging to the second group.

10. The apparatus according to claim 9, wherein the first metadata is written so that previously written metadata belonging to the first group is pointed to.

11. The apparatus according to claim 10, wherein the first metadata comprises one or more of information related to a generation of metadata recorded on the tape medium, and information related to a recording position of metadata recorded on the tape medium.

12. The apparatus according to claim 9, wherein the second group includes metadata automatically written by the file system at a time at which a file is closed.

13. The apparatus according to claim 9, wherein the metadata recorded in the data partition includes a generation number and one or more block numbers of a tape medium that includes a previously written generation of metadata.

14. The apparatus according to claim 13, wherein the metadata overwritten on the index partition includes only the most recently recorded metadata.

15. The apparatus according to claim 9, wherein a file mark is written before and after the first metadata on the tape medium.

16. The apparatus according to claim 15, wherein the operations performed by the program code further comprise:
    tracing the first metadata; and
    displaying to a user a list of metadata belonging to the first group.

* * * * *